(12) United States Patent
Di Egidio et al.

(10) Patent No.: US 8,083,876 B2
(45) Date of Patent: Dec. 27, 2011

(54) MACHINE AND METHOD FOR APPLYING A TREAD TO A TYRE CARCASS

(75) Inventors: Alfonso Di Egidio, Rome (IT); Roberto Pontone, Rome (IT)

(73) Assignee: Bridgestone Corporation, Tokyo (JP)

( * ) Notice: Subject to any disclaimer, the term of this patent is extended or adjusted under 35 U.S.C. 154(b) by 582 days.

(21) Appl. No.: 11/794,360

(22) PCT Filed: Dec. 27, 2005

(86) PCT No.: PCT/EP2005/057188
§ 371 (c)(1),
(2), (4) Date: Mar. 27, 2008

(87) PCT Pub. No.: WO2006/070000
PCT Pub. Date: Jul. 6, 2006

(65) Prior Publication Data
US 2008/0314503 A1    Dec. 25, 2008

(30) Foreign Application Priority Data
Dec. 28, 2004  (IT) ............................. TO2004A0914

(51) Int. Cl.
B29D 30/30     (2006.01)
(52) U.S. Cl. .................. 156/96; 156/128.6; 156/128.1; 156/129; 156/229; 156/406.6
(58) Field of Classification Search .................. 156/350, 156/96, 123, 128.1, 128.6, 129, 229, 405.1, 156/406.4, 406.6
See application file for complete search history.

(56) References Cited

U.S. PATENT DOCUMENTS

| 3,907,019 | A |   | 9/1975  | Montagne |
| 4,062,716 | A |   | 12/1977 | Galantine et al. |
| 4,206,009 | A |   | 6/1980  | Kazares |
| 4,692,868 | A | * | 9/1987  | Wesner et al. ............... 701/205 |

(Continued)

FOREIGN PATENT DOCUMENTS

| EP | 1 120 235 A2 |   | 8/2001 |
| EP | 1120235      | * | 8/2001 |
| EP | 1 188 546 A2 |   | 3/2002 |

(Continued)

OTHER PUBLICATIONS

Electrical Engineer's Reference Book, Sixteenth Edition M.A. Laughton and D.J. Warne 2003 Section 13.27.9.*

(Continued)

*Primary Examiner* — Richard Crispino
*Assistant Examiner* — Martin Rogers
(74) *Attorney, Agent, or Firm* — Oliff & Berridge, PLC

(57) ABSTRACT

A machine and method for applying a tread to a carcass of a tire; the machine has a rotary drum supporting the carcass, a feed conveyor for feeding the tread to the rotary drum, a pressure roller contacting the tread, an actuating device for pushing the pressure roller against the tread with a force of adjustable intensity, and a control unit for regulating the intensity of the force as a function of an error variable calculated as the difference between the length of the remaining portion of the circumference of the carcass, and the length of the remaining portion of the tread; and the control unit regulates the intensity of the force by means of a proportional control block having a gain varying as a function of the value of the error variable and as a function of the rate of change of the error variable.

5 Claims, 3 Drawing Sheets

U.S. PATENT DOCUMENTS

| | | | | |
|---|---|---|---|---|
| 4,856,286 | A | * | 8/1989 | Sulfstede et al. .................. 62/89 |
| 5,302,944 | A | * | 4/1994 | Curtis ........................... 340/653 |
| 5,364,490 | A | | 11/1994 | Hilke et al. |
| 6,005,901 | A | * | 12/1999 | Linz ............................... 375/355 |
| 6,041,320 | A | * | 3/2000 | Qin et al. ........................... 706/1 |
| 6,109,322 | A | * | 8/2000 | Benzing et al. ............... 152/548 |
| 6,515,446 | B1 | * | 2/2003 | Koide et al. ................... 318/700 |
| 2002/0088528 | A1 | * | 7/2002 | Usami et al. .................... 156/95 |
| 2003/0235262 | A1 | * | 12/2003 | Staszewski et al. ........... 375/376 |
| 2004/0127652 | A1 | * | 7/2004 | Majumdar et al. ............ 525/380 |

FOREIGN PATENT DOCUMENTS

| | | |
|---|---|---|
| GB | 1 250 196 | 10/1971 |
| GB | 1250196 | * 10/1971 |
| GB | 1 560 820 | 2/1980 |

OTHER PUBLICATIONS

Yusuf Rezah Jafry A Multiple Scales Approach to the Stability and Control of a Hypersonic Re-entry Glider Dec. 18, 1987 Massachusetts Institute of Technology Section 6.2, p. 79.*

* cited by examiner

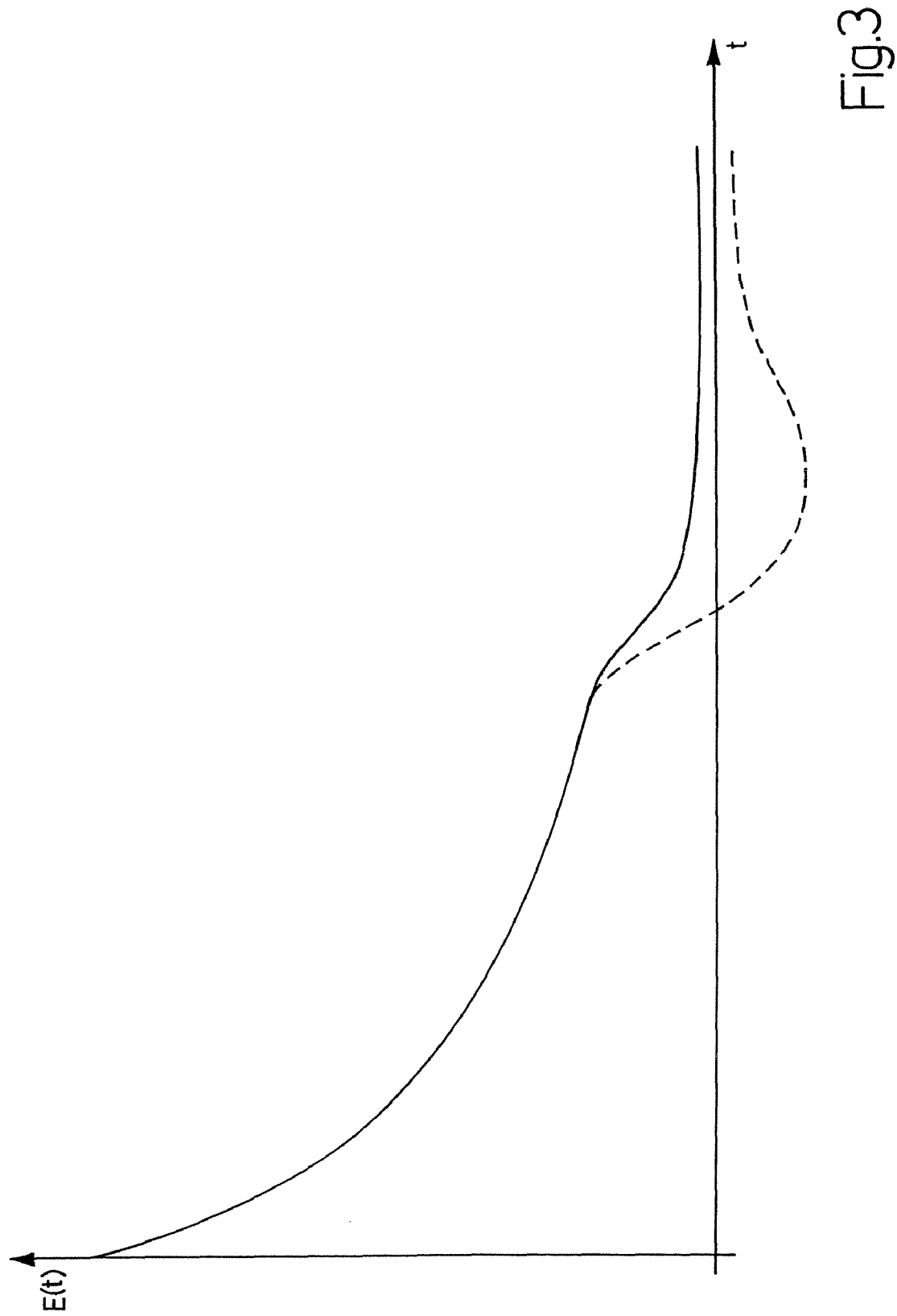

MACHINE AND METHOD FOR APPLYING A TREAD TO A TYRE CARCASS

TECHNICAL FIELD

The present invention relates to a machine and method for applying a tread to a tire carcass.

BACKGROUND ART

A machine for applying a tread to a tire carcass, e.g. of the type described in Patent Application EP-1230235-A2, comprises a rotary drum supporting the carcass; a feed conveyor for feeding the tread to the rotary drum; a pressure roller contacting the tread between the drum and the feed conveyor; an actuating device for pushing the pressure roller against the tread with a force of adjustable intensity; and a control unit for regulating the intensity of the force produced by the actuating device as a function of an error variable calculated as the difference between the length of the remaining portion of the circumference of the carcass, and the length of the remaining portion of the tread. Other examples of machines for applying a tread to a tire carcass are described in Patents DE-2105765-A, U.S. Pat. No. 3,728,181-A1, U.S. Pat. No. 5,427,636-A1 and EP-0704296-A1.

The purpose of the pressure roller is to exert pulling force on, to permanently stretch, the tread; and a precise amount of permanent stretch must be produced on the tread to achieve the desired predetermined overlap of the two free ends of the tread when it is wound about the carcass.

When applying a cured new tread to a carcass as part of a tire retreading process involving no curing, the new tread must be cut taking into account the tread pattern, and so cannot be cut exactly to size with respect to the actual circumference of the carcass. The tread-stretching action of the pressure roller is therefore essential in ensuring correct application of the tread to the carcass. When applying a green tread to a carcass as part of the original tire manufacturing process or as part of a tire retreading and curing process, the new tread is cut exactly to size with respect to the actual circumference of the carcass, but may subsequently undergo a slight, unpredictable variation in length due to shrinkage caused by changes in temperature. In which case, the tread-stretching action of the pressure roller may prove useful in ensuring correct application of the tread to the carcass.

The control unit of known machines for applying a tread to a tire carcass, e.g. of the type marketed by SH under the trade name "Hitech Extru-Builder Baz 2160", comprises a PID (Proportional-Derivative-Integral) control block, which regulates the intensity of the force produced by the actuating device as a function of the error variable.

Numerous tests show precise tread stretch by the pressure roller of known machines for applying a tread to a tire carcass to be extremely difficult to achieve. To increase tread stretch precision of the pressure roller, it has been proposed to increase gain of the integral contribution, which, however, results in oscillating and potentially unstable control, with obvious anomalous stress of the tread. To reduce oscillation, therefore, it has been proposed to increase gain of the derivative contribution, which in turn reduces control speed and prevents sufficient error reduction in the time taken to apply the tread.

DISCLOSURE OF INVENTION

It is an object of the present invention to provide a machine and method for applying a tread to a tire carcass, designed to eliminate the aforementioned drawbacks, and which, in particular, are cheap and easy to implement.

According to the present invention, there are provided a machine and method for applying a tread to a tire carcass, as recited in the accompanying Claims.

BRIEF DESCRIPTION OF THE DRAWINGS

A non-limiting embodiment of the present invention will be described by way of example with reference to the accompanying drawings, in which:

FIG. 3 shows a graph of an error variable controlled by the FIG. 2 control unit.

BEST MODE FOR CARRYING OUT THE INVENTION

Figure 1:
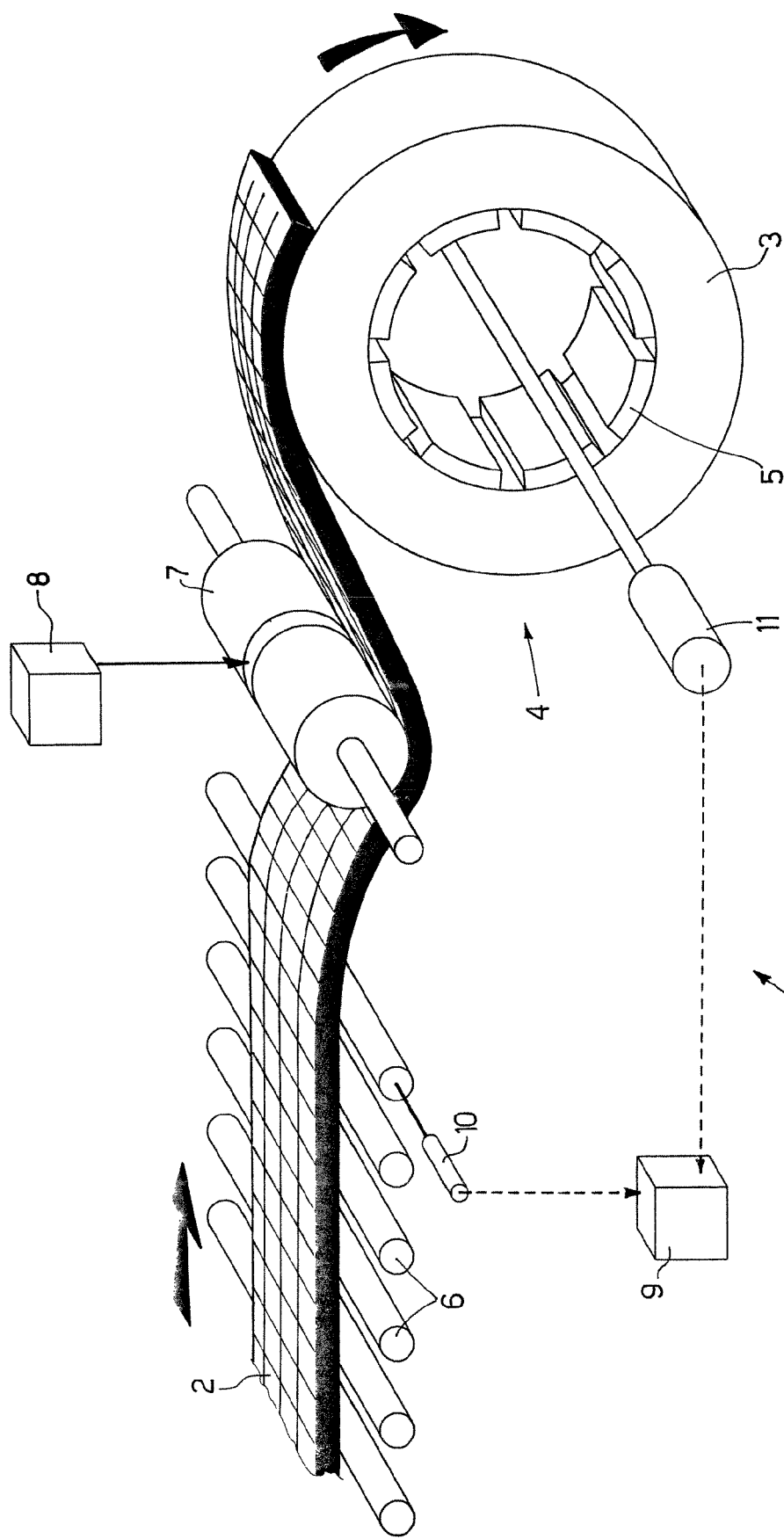
FIG. 1 shows a schematic view in perspective of a machine for applying a tread to a tire carcass in accordance with the present invention.

Number 1 in FIG. 1 indicates as a whole a machine for applying a tread 2 to a carcass 3 of a tire 4. Machine 1 comprises a rotary drum 5 supporting carcass 3; a feed conveyor 6 for feeding tread 2 to rotary drum 5; a pressure roller 7 contacting tread 2 between drum 5 and feed conveyor 6; and an actuating device 8 (in particular, a pneumatic piston controlled by a proportional solenoid valve) for pushing pressure roller 7 against tread 2 with a force F of adjustable intensity.

A control unit 9 regulates the intensity of force F produced by actuating device 8 as a function of an error variable E calculated as the difference between the length RCC of the remaining portion of the circumference of carcass 3, and the length RTL of the remaining portion of tread 2. To do this, control unit 9 is connected to a sensor 10 for measuring feed of tread 2; i.e. for measuring the value of length RTL of the remaining portion of tread 2; and to a sensor 11 for measuring rotation of carcass 3, i.e. for measuring length RCC of the remaining portion of the circumference of carcass 3.

The purpose of control unit 9 is to zero the value of error variable E by the time tread 2 is applied to carcass 3. A constant quantity or so-called "Stretch Factor" may be added automatically to error variable E to achieve a given overlap of the two ends of tread 2.

Figure 2:
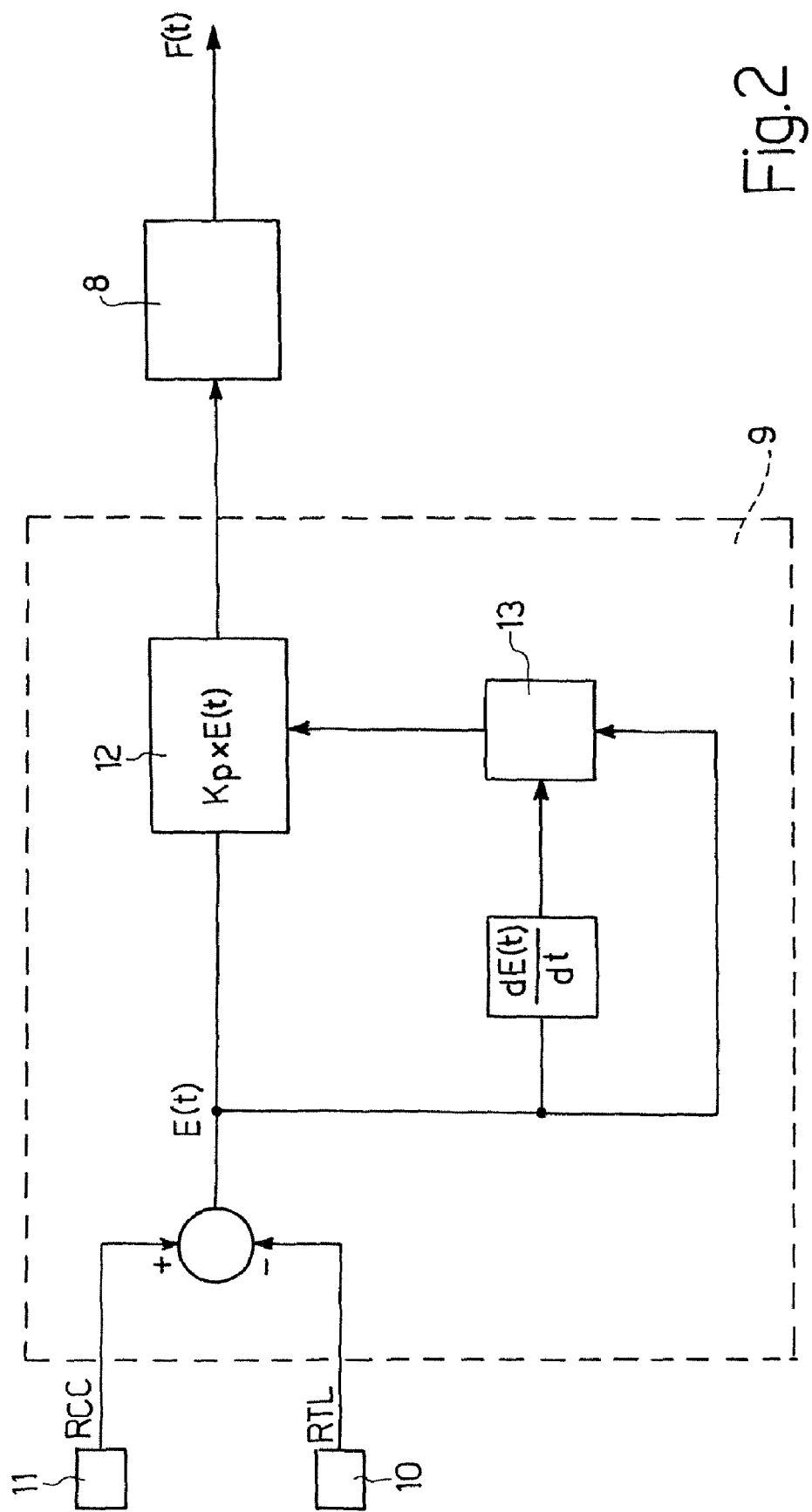
FIG. 2 shows a diagram of a control unit of the FIG. 1 machine.

As shown in FIG. 2, control unit 9 comprises a proportional control block 12 having a variable gain Kp, and which regulates the intensity of force F produced by actuating device 8 as a function of error variable E. The value of gain Kp of proportional control block 12 is modified dynamically by a computing block 13 as a function of the value of error variable E, and as a function of the rate of change, i.e. the first derivative, of error variable E.

In a preferred embodiment, computing block 13 checks gain Kp of proportional control block 12 with a given time frequency, and, for each check, operates according to the following control strategy:

computing block 13 maintains gain Kp of proportional control block 12 constant when the absolute value of error variable E is above a threshold EL, and when the rate of change of error variable E, in absolute value, is above a threshold VL;

computing block 13 increases gain Kp of proportional control block 12 when the absolute value of error variable E is above threshold EL, and when the rate of change of error variable E, in absolute value, is below threshold VL;

computing block 13 reduces gain Kp of proportional control block 12 when the absolute value of error variable E is below threshold EL, and when the rate of change of error variable E, in absolute value, is above threshold VL; and computing block 13 maintains gain Kp of proportional control block 12 constant when the absolute value of error variable E is below threshold EL, and when the rate of change of error variable E, in absolute value, is below threshold VL.

Good test results have been obtained when computing block 13, if necessary, modifies gain Kp of proportional control block 12 at 2 Hz frequency and by a given IGF quantity equal to 50% of the initial value of gain Kp of proportional control block 12; and even better test results, in terms of speed and precision, have been obtained when a constant so-called "Fixed Pressure" quantity is added to the output value of proportional control block 12.

Threshold EL preferably has a first value when error variable E is positive, and a second value when error variable E is negative, i.e. the absolute value of threshold EL differs, depending on whether error variable E is positive or negative. Typically, the absolute value of threshold EL is higher when error variable E is positive than when error variable E is negative.

In an alternative embodiment, computing block 13 only adjusts gain Kp of proportional control block 12 as a function of the value of error variable E, without taking into account the rate of change of error variable E. More specifically, computing block 13 increases gain Kp of proportional control block 12 when the absolute value of error variable E is above a threshold VS1; reduces gain Kp of proportional control block 12 when the absolute value of error variable E is below a threshold VS2; and maintains gain Kp of proportional control block 12 constant when the absolute value of error variable E lies between threshold VS1 and threshold VS2.

FIG. 3 shows the results of two tests, and more specifically a time graph of error variable E relative to two different applications of tread 2.

The parameter values of control unit 9—i.e. the initial value of gain Kp of proportional control block 12, the update frequency of gain Kp of proportional control block 12, and the IGF quantity by which gain Kp of proportional control block 12 is varied—are determined experimentally, and normally depend on the construction characteristics of the control unit. Optimum "Fixed Pressure" and "Stretch Factor" values must also be determined experimentally for different types of tread 2.

Machine 1 as described above may be used, with excellent results, for applying a cured new tread to a carcass as part of a tire retreading process involving no curing, or for applying a green tread to a carcass as a part of the original tire manufacturing process or as part of a tire retreading and curing process. Tests of both applications show machine 1, as described above, ensures a highly precise and, above all, constant final value of error variable E.

The invention claimed is:

1. A method of applying a tread to a carcass of a tire, the method comprising:
mounting the carcass onto a rotary drum;
applying a first end of the tread to the carcass;
feeding the tread to the carcass via a feed conveyor, while at the same time rotating the rotary drum;
applying a pressure force on the tread by contacting the tread with a pressure roller spaced from the rotary drum and arranged between the rotary drum and the feed conveyor and at a given distance upstream from the rotary drum so that the pressure roller presses the tread upstream from the rotary drum;
calculating an error variable as a difference between a length of a remaining portion of a circumference of the carcass and a length of a remaining portion of the tread;
automatically adding a first constant quantity to the error variable to obtain a given overlap of two ends of the tread; and
regulating an intensity of the force applied by the pressure roller as a function of the error variable with a proportional control block having a variable gain and by varying the gain of the proportional control block as a function of a value of the error variable,
wherein:
the gain of the proportional control block is maintained constant when the value of the error variable is above a first threshold in absolute value, and when a rate of change of the error variable is above a second threshold in absolute value;
the gain of the proportional control block is increased when the value of the error variable is above the first threshold in absolute value, and when the rate of change of the error variable is below the second threshold in absolute value;
the gain of the proportional control block is reduced when the value of the error variable is below the first threshold in absolute value, and when the rate of change of the error variable is above the second threshold in absolute value; and
the gain of the proportional control block is maintained constant when the value of the error variable is below the first threshold in absolute value, and when the rate of change of the error variable is below the second threshold in absolute value.

2. A method as claimed in claim 1, wherein a second constant quantity is added to an output value of the proportional control block.

3. A method as claimed in claim 1, wherein the gain of the proportional control block is modified with a frequency of 2 Hz and by a given quantity equal to 50% of an initial value of the gain of the proportional control block.

4. A method as claimed in claim 1, wherein the first threshold has a first value when the error variable is positive, and a second value when the error variable is negative.

5. A method as claimed in claim 4, wherein the first value of the first threshold is higher than the second value of the first threshold.

* * * * *